United States Patent [19]

Schöppel et al.

[11] 4,398,744
[45] Aug. 16, 1983

[54] LOAD ROD FOR VEHICLES

[75] Inventors: Roman Schöppel, Sindelfingen; Wolfgang Fischer, Leinfelden; Bernd Harloff, Böblingen, all of Fed. Rep. of Germany

[73] Assignee: Daimler-Benz Aktiengesellschaft, Sutttgart, Fed. Rep. of Germany

[21] Appl. No.: 239,510

[22] Filed: Mar. 2, 1981

[30] Foreign Application Priority Data

Jan. 3, 1980 [DE] Fed. Rep. of Germany ....... 3007897

[51] Int. Cl.³ .............................................. B60D 1/14
[52] U.S. Cl. ................................... 280/504; 248/499; 248/503; 280/495; 294/82 AH; 410/101; 410/106
[58] Field of Search ........................ 280/504, 505–509, 280/495; 294/82 R, 82 AH; 16/DIG. 5; 248/499, 65, 67.5, 67.7, 74 R, 151, 153, 154, 302, 503, 68, 69; 410/10, 11, 55, 106, 107, 108, 110, 111, 77, 101, 23, 24, 33, 43, 48, 156; 296/35.1; 213/50, 61, 75 R

[56] References Cited

U.S. PATENT DOCUMENTS 3,390,896 7/1968 Philapy .......................... 280/423 R

FOREIGN PATENT DOCUMENTS 457772 7/1949 Canada ............................... 280/495
3007897 9/1981 Fed. Rep. of Germany ...... 280/504
1381039 10/1964 France ............................... 280/495
629873 9/1949 United Kingdom ............... 280/504

Primary Examiner—Joseph F. Peters, Jr.
Assistant Examiner—Mitchell J. Hill
Attorney, Agent, or Firm—Craig & Burns

[57] ABSTRACT

A load rod for vehicles, especially motor vehicles, which rod is constructed so as to be a tow rod, an impact rod, a mounting rod, or similar rod. The load rod includes a loop portion as well as force distributing legs that diverge from the loop portion and extend at a distance from each other. The force distributing legs are provided with a mounting section for enabling a mounting of the force distribution legs at portions of a body of the motor vehicle that have greater rigidity. The mounting sections are joined to the body portion of the motor vehicle by a welding. The load rod, formed as a connecting rod, includes at least two individual shaped rods having a predetermined cross section. The individual shaped rods are, within a connecting level, placed against each other with their rod loop portions and are welded together, while the individual force distributing legs diverge outwardly in a direction from both sides of the connecting level.

14 Claims, 7 Drawing Figures

LOAD ROD FOR VEHICLES

The present invention relates to a load rod and, more particularly, to a load rod such as, for example, a tow rod, an impact rod, or a mounting rod of a motor vehicle that is fashioned as a shape rod and includes a rod loop part as well as force distributing legs that diverge from the rod loop part and extend at a distance from each other, with a mounting means being provided for mounting the load rod at portions of a motor vehicle having greater rigidity.

Load rods of the aforementioned type such as, for example, tow rods, have been proposed which are exclusively fashioned from sheet metal; however, a disadvantage of such proposed load rods resides in the fact that with rods of certain dimensions, the locally introduced forces in the load rod result in considerable deformation. To compensate for and or to prevent deformation of the load rod due to an introduction of forces, generally, the dimensions of the whole load rod are increased so as to provide for a more or less oversized load rod.

A further disadvantage of the above-noted proposed load rods resides in the fact that, since the load rods are fashioned exclusively of sheet metal, they are expensive to manufacture especially if the load rods are expected to withstand or carry substantial forces with a minimum structural volume. Moreover, with sheet metal load rods additional expenses are incurred if the load rods are to be equipped with elastic cushioning elements such as, for example, rubber or other elastomeric parts.

In the above-noted proposed sheet metal load rods which, for example, are provided with a closed or half closed composite or bracket, a disadvantage resides in the fact that the corrosion behavior of such load rods is not especially favorable and, consequently, relatively high costs are required to protect the load rod against corrosion.

It has also been proposed to provide load rods which are a combination of a load rod and a sheet metal bracket; however, in these proposed constructions the sheet metal bracket must be dimensioned such that, although the load rod connected on one side may possible withhold or withstand an introduction of forces, the bracket must be oversized and fashioned so as to be able to withstand the occurring high forces in the sheet metal bracket even in a connecting area of the load rod with the bracket. Thus, the bracket, as a whole, must be oversized to take into account the occurring forces.

The aim underlying the present invention essentially resides in providing a load rod which is insensitive to deformation due to an introduction of forces into the load rod and which is capable of transmitting the forces to a stiffer or more rigid portion of a body of the motor vehicle.

In accordance with advantageous features of the present invention, a load rod such as, for example, a tow rod, impact rod, or mounting rod, is fashioned as a connecting rod which is formed from at least two individual shaped rods, with each of the individual shaped rods being provided with loop portions. The individual shaped rods are connected together in an area of the loop portions along a connecting level by a weld or the like, with individual force distributing legs of the rods diverging outwardly on both sides of the connecting level.

By virtue of the above-noted features of the present invention, a load rod is provided which is of a relatively small structure but which nevertheless is capable of absorbing relatively high forces as well as being subjected to high loads. Particular advantages of a load rod constructed in accordance with the present invention resides in the fact that not only is the load rod easy to manufacture but also the load rod is insensitive to deformation caused by an introduction of force into the load rod. Additionally, although the load rod is relatively lightweight, it nevertheless is, to a relatively high degree, rigid in shape. Moreover, locally introduced forces are absorbed by the connecting rod and here also, locally high forces and/or high pressures are tolerated.

By connecting the rod loop portions of the individual shaped rods to each other in accordance with the present invention, it is possible for the rod loop portions to distribute the force and/or load peaks which result from occurring forces to a large area of a body portion of the motor vehicle since the individual force or load distributing legs, diverging in a direction of the body part of the motor vehicle, by means of a suitable angular adjustment, are especially adaptable to the flow of the force and/or load, with the ends of the distributing legs being firmly attached or connected to the vehicle body part by, for example, welding or the like. Thus, with the construction of the present invention, there are practically no force or load induced deformations.

Additionally, in accordance with the present invention, the force distribution legs are suitably positioned so as to create a prerequisite for producing a favorable force distribution which may readily be adapted to each individual case in order to reduce high local forces and distribute such forces into the more rigid structure of the body part of the motor vehicle is a predetermined manner.

Moreover, the adaptation of the shape and the direction of the individual force distributing legs to respective geometrically constructed conditions as well as a direction force to be placed on the load rod leads to solutions that are especially favorable with regard to weight and overall manufacturing expenses.

The advantages obtained by the load rod construction in accordance with the present invention become even more greater the further, for example, the force or load introduction point into the rod is away from the carrying portions of the body of the motor vehicle. With previously proposed constructions, it was required to provide correspondingly higher sheet metal brackets which were heavy and expensive; however, such is not the case with a load rod constructed according to the present invention.

Additionally, by virtue of the features of the present invention, it is possible to construct and design a load rod, favorable with respect to the overall weight, which is capable of absorbing or withstanding forces applied in several directions. Moreover, the corrosion behavior of the load rod of the present invention is considerably more favorable than that in previously proposed constructions utilizing sheet metal brackets.

Further advantages of the present invention reside in the fact that by virtue of the construction and mounting of the load rod of the present invention at a body part of the vehicle, in case of a frontal collision the load rod only deforms itself in an area of its longitudinal base but not in the remaining areas so that a force introduction area, that is, the area of the rod loop portions that are connected with each other, may nevertheless still be used as a salvage or recovery loop.

Advantageously, in accordance with the present invention, each individual rod forming the connecting rod may be formed of a round cross section; however, it is also possible for the individual rods to have a square cross section, an angle cross section, a T cross section or a U-shaped cross section. It is also possible for the individual rods to have a hollow or tubular cross sectional configuration.

Advantageously, in accordance with further features of the present invention, the individual shaped rods are firmly connected with their rod loop parts at least centrally aligned in a longitudinal direction of the vehicle or parallel to the longitudinal direction.

The connecting level within which the individual shape rods are firmly connected along their rod loop parts may extend diagonally in a direction to one side or the other and at an angle with respect to the longitudinal center plane of the motor vehicle.

The force distributing legs are each provided with mounting sections, with the mounting sections of at least some or all of the force distributing legs being, in each case, bent in such a manner that free ends of the mounting sections point away from the rod loop part or point toward the rod loop part.

The mounting sections of one of the individual shaped rods extend at least essentially parallel to the mounting sections of the other individual shaped rods. It is also possible for the mounting sections to all extend essentially parallel to the connecting level within which the rod loop portions are connected.

Advantageously, in accordance with the present invention, each rod loop part is apporximately the shape of a semi-circular ring, with an axis of the ring extending at least essentially at a right angle to the connecting level. A ring loop may be inserted into the connected rod loop parts.

Each of the individual shaped rods, in side view, may have an approximate U-shape or a slight trapezoidal shape. Each rod loop part of the load rod of the present invention may be formed by a cross bar that connects the force distributing legs with each other and extends transversely with respect to the force distributing legs. The cross bars of the connecting rod are connected with each other and, in each case, bent to form an approximate horizontal U with the openings of the U-shape being placed against each other.

Advantageously, a rubber or other elastomeric cushioning element is mounted on the connected rod loop parts and, advantageously, on the cross bars.

Accordingly, it is an object of the present invention to provide a load rod which avoids, by simple means, shortcomings and disadvantages encountered in the prior art.

Another object of the present invention resides in providing a load rod which is simple in construction and therefore relatively inexpensive to manufacture.

Yet another object of the present invention resides in providing a load rod which is relatively lightweight but yet capable of withstanding relatively large load or impact forces.

Another object of the present invention resides in providing a load rod, especially for motor vehicles, which is capable of translating large forces and/or to stiffer or more rigid portions of the motor vehicle.

Yet another object of the present invention resides in providing a load rod for vehicles, especially motor vehicles, which is capable of withstanding large forces and/or loads with a minimum deformation.

A still further object of the present invention resides in providing a load rod for vehicles, especially motor vehicles, which has a favorable corrosion behavior.

These and other objects, features, and advantages of the present invention will become more apparent from the following description when taken in connection with the accompanying drawings which show, for the purposes of illustration only, several embodiments in accordance with the present invention, and wherein.

Figure 1:
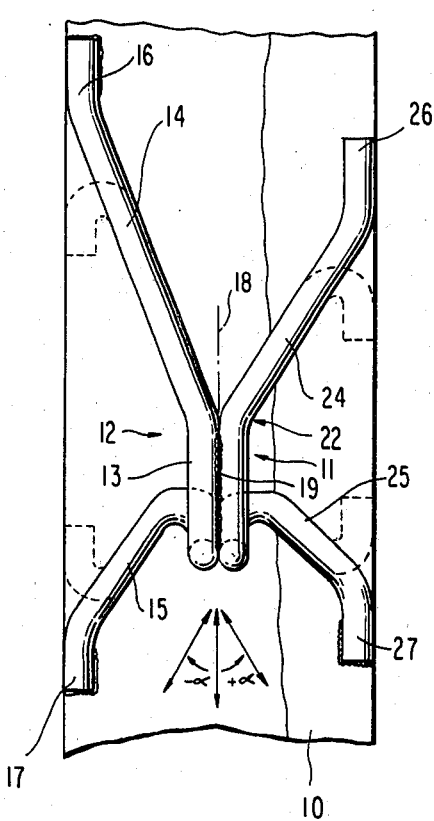
FIG. 1 is a front view of a load rod constructed in accordance with the present invention mounted at a body portion of a motor vehicle.
Figure 2:
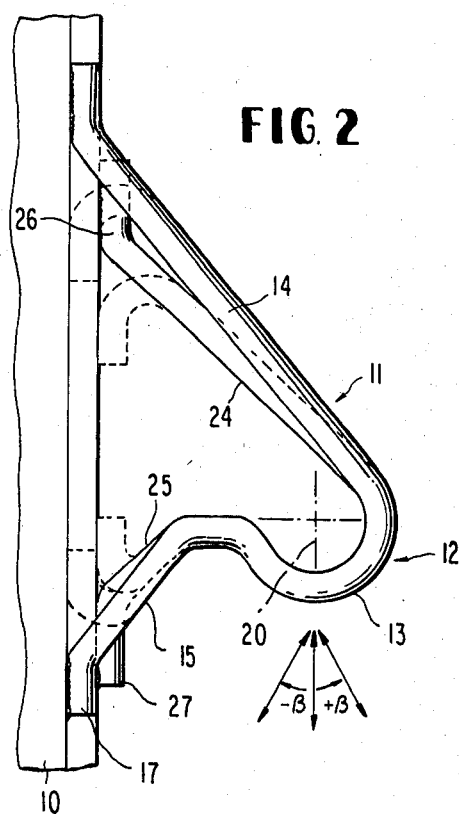
FIG. 2 is a side view of the load rod of FIG. 1.
Figure 3:
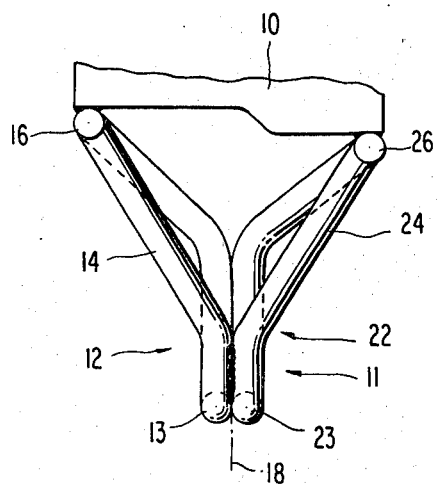
FIG. 3 is a top view of the load rod of FIG. 1.

Referring now to the drawings wherein like reference numerals are used throughout the various views to designate like parts and, more particularly, to FIGS. 1-3, according to these figures, a body portion 10 of a motor vehicle, especially a motor vehicle (not shown) has a load rod generally designated by the reference numeral 11 such as, for example, a tow rod or the like mounted thereon by, for example, welding. The shaped load rod 11 is fashioned as a metallic connecting rod and is formed of at least two individual shaped rods generally designated by the reference numerals 12 and 22. Each individual shaped rod 12, 22 has a predetermined profile or cross section which, in the illustrated embodiment of FIGS. 1-3 is a round cross section. As can be appreciated, the profile or cross section of the individual shaped rods, 12, 22 may be square, angled, a T-shape, or a U-shape. Moreover, the individual shaped rods 12, 22 may either be constructed of a solid material or of a tubular material.

As shown most clearly in FIG. 2, the individual shaped rod 12 includes a rod loop portion 13 and two force distributing legs 14, 15 which diverge from the loop portion 13 and extend at a distance from each other. The force distributing legs 14, 15 are formed in one piece with the rod loop portion 13 and each force distributing leg 14, 15 changes over, without a seam, into a mounting section 16, 17, of equal thickness, with the respective mounting section 16, 17 being secured to the body part by, for example, welding.

As with the individual shaped rod 12, the other individual shaped rod 22 also includes a rod loop portion 23 as well as two force distributing legs 24, 25 that diverge from the loop parts 23 and extend at a distance from each other. The distributing legs 24, 25 each change over, without a seam, into a mounting section 26, 27 of equal thickness, by means of which a mounting or attachment of the shaped rod 22 to the body part is effected by, for example, welding.

As is readily apparent the load rod forming a connecting rod or the like is constructed in such a manner that the two individual shaped rods 12 and 22, prior to being welded to the body part 10 form a rigid unit. To form the rigid unit, the individual shaped rods 12, 22 are brought into abutment along a connecting line or level 18 (FIGS. 1 and 3) with the respective rod loop portions 13, 23 being in alignment. The individual shaped rods 12, 22 are then welded to each other along a line 19. With the rods 12, 22 welded together, the four individual force distributing legs 14, 15 and 24, 25 diverge to both sides of the connecting line or level 18 in a manner somewhat similar to spider legs.

When the rigid unit formed by the individual rods 12 and 22 is mounted on the body part 10, the connecting level or line 18 within which the two individual shaped rods 12 and 22 and rod loop portions 13 and 23 are connected, is adjusted so as to be at last essentially in alignment with or parallel to a longitudinal axis of the motor vehicle. It is also possible for the connecting level or line to extend diagonally or at an angle to one side or the other with respect to the longitudinal direction of the vehicle in dependence upon actual conditions and forces to which the load rod is to be subjected. Thus, the connecting level or line 18 may be directed diagonally to the left or the right of FIG. 3.

While the load rod construction in accordance with FIGS. 1–3 utilizes an individual shaped rod 12 having a configuration which differs from that of the other individual shaped rod 22, as can readily be appreciated, such difference in configuration is not absolutely necessary since the illustrated embodiment of FIGS. 1–3 takes into account actual existing conditions.

As shown in solid lines in FIGS. 1 and 2, the mounting sections 16 and 17 of the individual shaped rod 12 as well as the mounting sections 26 and 27 of the other individual shaped rod 22 are bent in such a manner that they are directed away from the rod loop portion 13 and 23, with the mounting sections 16 and 26 being directed upwardly and the mounting sections 26, 27 being directed downwardly. It is also possible, as shown in phantom line in FIGS. 1 and 2, for all of the mounting sections 16, 17 and 26, 27 to be bent in such a manner that, in each case, that point or extend in direction of the rod loop portions 13, 23 thereby considerably reducing the dimensions of the load rod 11, as viewed in a direction of the connecting level or line 18 and measured from a top to the bottom of FIGS. 1 and 2.

In both of the above identified situations, the mounting sections 16, 17 and 26, 27 all extend at least essentially parallel to the connecting level 18 with the mounting sections 16, and 17 on the left hand side of FIG. 1, additionally being aligned at least essentially parallel to mounting sections 26, 27 on the right hand side of FIG. 1.

As shown in FIG. 2, each rod loop part 13 and 23 has an approximate shape of a semi-circular ring which, in FIG. 2, is closed toward the bottom and open toward the top. A center axis, schematically illustrated in FIG. 2 by an intersection of axes 20, is disposed so as to extend essentially at a right angle with respect to the connecting level or line 18. As can be readily appreciated, a ring loop (not shown) which is closed on all sides may, for example, be inserted into the rod loop parts 13, 23.

By virtue of the provision of the welded seam along the line 19 for connecting the two rod loop parts 13 and 23 to each other, a firm or rigid unit along the welded seam is formed whereby each of the individual shaped rods 12, 22 are brought into an almost gap free contact. The welded connection may be effected by conventional welding methods such as, for example by resistance welding, projection welding, pressure welding, MIG-welding, or MAG-welding, or similar processes.

The force diagrams represented by the force arrows of FIGS. 1 and 2 indicate the manner in which the shaped load rod 11 can transfer tension and pressure forces. In a horizontal plane, the pressures forces can be directly transmitted in a longitudinal direction as well as in a direction deviating from the longitudinal direction by a plus or minus $\alpha$ likewise, as shown in FIG. 2, in a vertical plane, the forces may be directly transmitted in a vertical direction into the load rod as well as in a direction deviating by a plus or minus $\beta$.

The individual force distributing legs 14, 15 and 24, 25, in each case extend apart in various directions from an actual force introduction area at a point where the two rod loop parts 13 and 23 are firmly welded to each other. The spacing of the respective force distributing legs 14, 15, and 24, 25 define support angles which may be selected so as to define the course or flow of the forces through the load rod. As shown in FIGS. 1 and 2, the force distributing legs 14, 15 on the one hand and 24, 25 on the other hand, may be of differing heights; however, it is also possible for the respective force distributing legs, in a manner not shown in the drawing, to have the same length as well as the same width. In this manner, a load rod used, for example, as a tow rod, may be readily adapted to different geometrical conditions of the vehicle and may be readily welded to various more rigid portions of the vehicle.

With a load rod 11, constructed in accordance with the present invention and mounted at a forward end of the motor vehicle, it is advantageous if, in case of a frontal collision, the load rod 11 only deforms in an area of the longitudinal base so that a force insertion ring arranged in the area of the rod loop parts 13 and 23 may still be used as a salvaging or recovery loop. Basically, the load rod 11 is, in an excellent manner, able to transmit or transfer introduced local forces into the body of the vehicle 10 which forces may, for example, be towing forces, pulling forces, salvaging forces, etc. With the load rod 11 used as, for example, an impact rod or mounting rod, the introduction and transfer of impact forces such as, for example, forces of exhaust installations, or of mounting forces such as, for example, transport or clamping lashing forces is also possible. The locally introduced forces are absorbed by the two individual shaped rods 12, 22 that are welded together, in which case, locally high forces and/or high pressures are readily tolerated. The rod loop parts 13, 23 distribute the force peaks to a larger area of the body of the motor vehicle because the individual force distributing legs 14, 15 and 24, 25 that act as support legs which, by selection of predetermined angular positions adapted to the flow or transmission of force, diverge in a direction of the body part 10 of the motor vehicle and are welded to the body part so that, in an advantageous manner, no deformations occur as a result of an introduction of force into the load rod 10.

By a suitable placing or locating of the force distributing legs 14, 15 and 24, 25, a favorable flow or transmission of force can be obtained where the high local forces are reduced and introduced into the structure of the body part 10 of the motor vehicle in a completely controlled manner. By adapting the force distributing legs 14, 15 and 24, 25 to existing geometrical constructive conditions of the motor vehicle and the direction of forces which are to be introduced into the load rod 11, a simple cost effective and weight effective solution for a load rod construction is attained.

The advantages of the load rod of the present invention become clearer when one takes into account or considers, for example, geometrical considerations, which require, for example, a disposition of a force introduction point further away from the carrying parts of the motor vehicle as well as considers the directions of the force effect on the load rod. In this connection, it is advantageous that the load rod 11 be constructed in a weight-effective manner with respect to several directions of force. Therefore, the load rod may be highly stressed with a low expenditure with regard to not only cost but also material and yet be relatively lightweight. While the load rod 11, in the illustrated embodiment of FIGS. 1–3 is a tow rod disposed at the forward end of the vehicle, such load rod may also be used as a rear tow rod.

Figure 4:
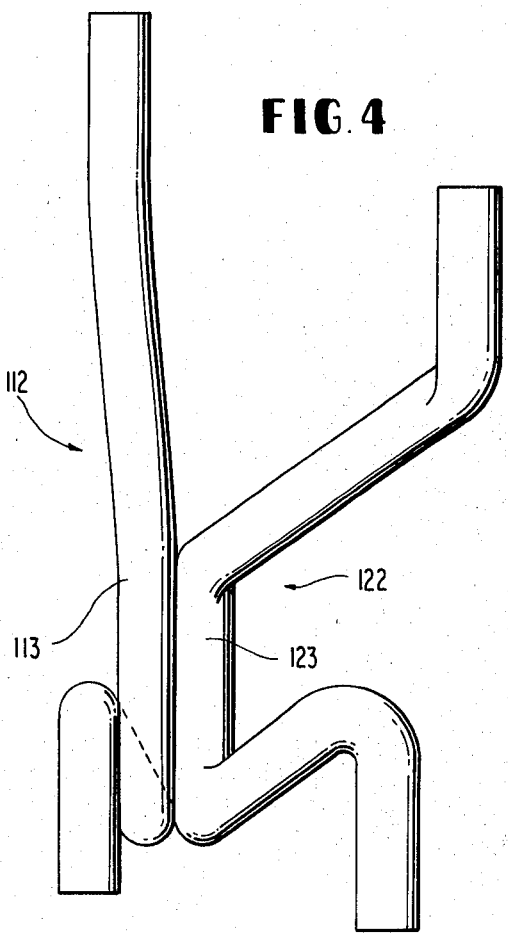
FIG. 4 is a front view of a load rod constructed in accordance with another embodiment of the present invention.

In the construction of FIG. 4, wherein the reference numerals for the corresponding elements in the construction of FIGS. 1–3 have been increased by 100, a difference between the first construction lies only in the fact that the two individual shaped rods 112, 122 deviate from each other even more than the corresponding individual shaped rods 12, 22. Additionally, the individual shaped rods 112, 122, in an area of corresponding rod loop parts 113, 123 are connected with each other by projection welding in a manner not illustrated. The load rod of FIG. 4 may, for example, be a tow rod disposed at a forward end of the vehicle.

Figure 5:
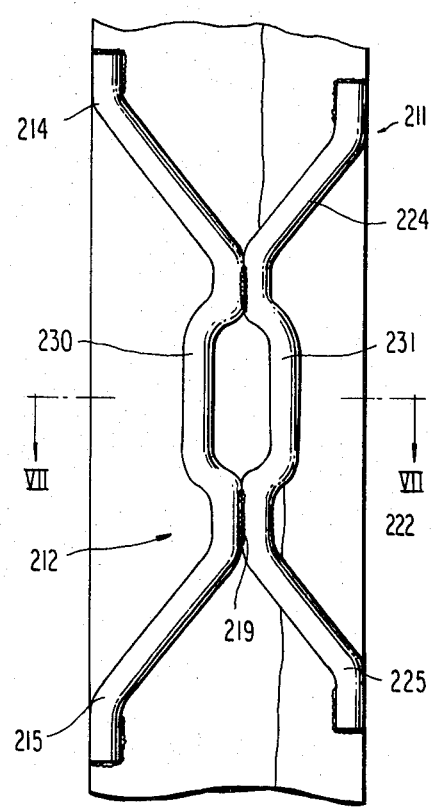
FIG. 5 is a front view of a load rod construction in accordance with a still further embodiment of the present invention.
Figure 6:
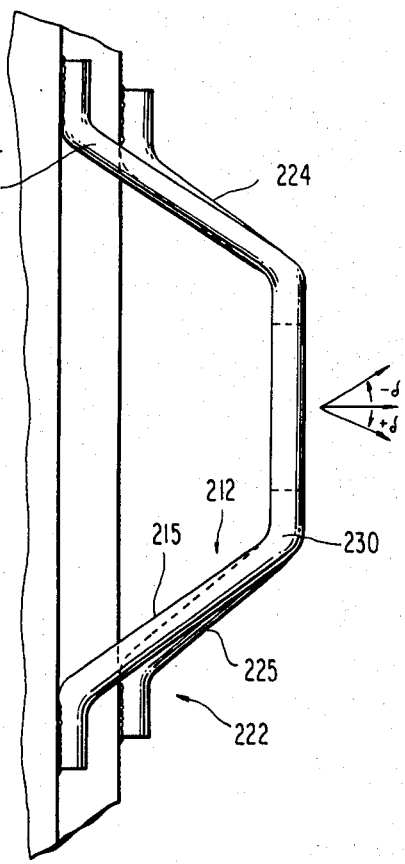
FIG. 6 is a side view of the load rod of FIG. 5.
Figure 7:
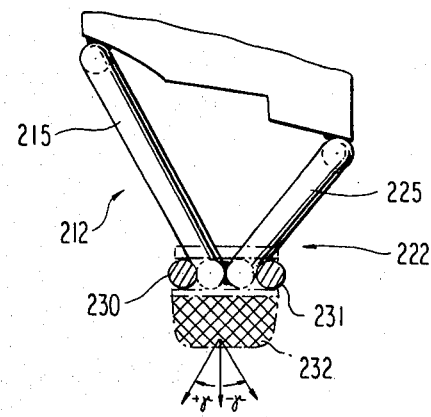
FIG. 7 is a cross sectional view taken along the line VII—VII in FIG. 5.

FIGS. 5–7 provide an example of a third construction of a load rod of the present invention wherein the reference numerals for the corresponding parts of the embodiment of FIGS. 1–3 have been increased by 200. As shown in FIG. 6, each of the individually shaped rods generally designated by the reference numerals 212, 222 are formed so as to assume a substantially U or slightly trapezoidal shape, with each rod loop part being formed by a cross bar 230, 231. The rod loop parts of the individual shaped rods 212, 222 are joined together along a weld seam 219. Force distributing legs 214, 215 and 224, 225 are formed in one piece with the respective cross bars 230, 231, with the respective cross bars 230, 231 extending transversely with respect to the associated force distributing legs 214, 215 and 224, 225.

As shown in FIG. 5, the cross bars 230, 231 of the connecting rod 211 are connected with each other and are bent so as to assume a horizontally disposed substantially U-shape with the respective openings of the U-shaped bent portions being disposed so as to face each other in such a manner so that a closed opening is defined between the cross bars 230, 231 when the individual shaped rods 212, 222 are joined together. As shown in FIG. 5, the opening formed by the U-shaped bent portions of the respective cross bars 230, 231 is also an approximately chain-like or oval shape with sections of the individual shaped rods 212, 222 disposed on respective sides of the opening resting against each other and being joined by the welded seam 219.

With the construction illustrated in FIGS. 5–7, the shaped rod or load rod 211 may, for example, form a mounting rod, especially a clamping bracket with the center loop or opening being used for attachments of clamping or lashing harnesses. With the load rod 211 used as a clamping or lashing harness, depending upon a disposition of the load rod 211 and accesibility thereto, vertical forces may be applied to the load rod 211. Likewise, it is possible for forces to act directly outwardly from the load rod 211 or at deviation of plus or minus γ as shown in FIG. 7, or directly outwardly or at a plus or minus Δ as shown in FIG. 6.

It is also possible to provide a rubber elastic cushioning element 232 formed of a rubber or plastic material, with the cushioning element 232 being disposed on the rod loop parts, especially in an area of the cross bars 230, 231 that are connected to each other. With such a construction having the cushioning element 232 mounted at the cross bars 230, 231, the shaped rod 211 may, for example, be used as an impact rod, for example, for a vehicle exhaust system or for axle parts of the vehicle.

While we have shown and described several embodiments in accordance with the present invention, it is understood that the same is not limited thereto but it susceptible of numerous changes and modifications as known to one having ordinary skill in theart and we therefore do not wish to be limited to the details shown and described herein, but intend to cover all such modifications as are encompassed by the scope of the appended claims.

We claim:

1. A load rod for vehicles, characterized in that the load rod comprises at least two individual shaped rod members, each of said rod members having a rod loop portion, and force distributing leg means diverging outwardly from said rod loop portion, mounting means are provided on each of the force distributing means for enabling a mounting of the load rod on a body portion of the vehicle, each of the individual rod members are in abutment with each other and joined to each other in an area of the respective rod loop portions along a predetermined connecting line, and in tht the force distributing leg means diverge in spider configuration outwardly from both sides of the predetermined connecting line.

2. A load rod according to one of claims 1 characterized in that the connecting line along which the rod loop portions are joined is at least one of substantially aligned with or parallel to a longitudinal center plane of the vehicle.

3. A load rod according to one of claim 1 characterized in that the connecting line along which the rod loop portions are joined is disposed at an angle to a longitudinal center plane of the vehicle.

4. A load rod according to claim 1, characterized in that the mounting means are bent in such a manner that free ends of the mounting means point in a direction away from the rod loop portions.

5. A load rod according to claim 1, characterized in that the mounting means are bent in such a manner that free ends of the mounting means point in a direction toward the rod loop portions.

6. A load rod according to one of claims 4 or 5, characterized in that the mounting means of one of the individual shaped rod members extend substantially parallel to the mounting means of the other individual rod shaped member.

7. A load rod according to one of claims 4 or 5, characterized in that the mounting means of each of the individual shaped rod members extend substantially parallel to the connecting line.

8. A load rod according to claim 1, characterized in that each rod loop portion has a substantially semi-circular shape with a center axis of the semi-circular shape rod loop portion extending substantially at a right angle to the connecting line.

9. A load rod for vehicles, comprising at least two individual shaped rod members, each of said rod members having a rod loop portion, and force distributing leg means diverging outwardly from said rod loop portion, mounting means provided on each of the force distributing means for enabling a mounting of the load rod on a body portion of the vehicle, each of the individual rod members joined in an area of the respective rod loop portions along a predetermined connecting line, the force distributing leg means diverge outwardly from both sides of the predetermined connecting line, each of the individual shaped rod members bent in such a way that, in a side view, the rod members have one of a substantially U-shaped configuration and a substantially trapezoidal configuration, and a cross bar means for defining each rod loop portion and for connecting the force distributing leg means to each other, the cross bar means extending substantially transversely to the respective force distributing leg means.

10. A load rod for vehicles comprising at least two individual shaped rod members, each of said rod members having a rod loop portion, and force distributing leg means diverging outwardly from said rod loop portion, mounting means provided on each of the force distributing means for enabling a mounting of the load rod on a body portion of the vehicle, each of the individual rod members joined in an area of the respective rod loop portions along a predetermined connecting line, the force distributing leg means diverge outwardly from both sides of the predetermined connecting line, each of the individual shaped rod members are bent in such a manner that, in a side view, the rod members have a substantially trapezoidal configuration, and each of the cross bar means are bent so as to assume a substantially U-shaped configuration, and in that the individual shaped members are connected to each other so that openings of the substantially U-shaped configured cross bar means face each other.

11. A load rod according to claim 10, characterized in that cushioning means are mounted on the load rod.

12. A load rod according to claim 11, characterized in that the cushioning means are disposed in an area of the rod loop portions.

13. A load rod according to claim 12, characterized in that the cushioning means are mounted at the cross bar means.

14. A load rod according to claim 13, characterized in that the cushioning means are formed of an elastomeric material.

* * * * *